(12) United States Patent
Farb

(10) Patent No.: US 12,454,940 B2
(45) Date of Patent: Oct. 28, 2025

(54) SAVONIUS WIND TURBINE RATIOS

(71) Applicant: Mark Daniel Farb, Beit Shemesh (IL)

(72) Inventor: Mark Daniel Farb, Beit Shemesh (IL)

( * ) Notice: Subject to any disclaimer, the term of this patent is extended or adjusted under 35 U.S.C. 154(b) by 995 days.

(21) Appl. No.: 17/277,299

(22) PCT Filed: Oct. 30, 2019

(86) PCT No.: PCT/IL2019/051172
§ 371 (c)(1),
(2) Date: Nov. 7, 2021

(87) PCT Pub. No.: WO2020/100133
PCT Pub. Date: May 22, 2020

(65) Prior Publication Data
US 2023/0258152 A1 Aug. 17, 2023

Related U.S. Application Data (60) Provisional application No. 62/767,879, filed on Nov. 15, 2018, provisional application No. 62/840,929, filed on Apr. 30, 2019.

(51) Int. Cl.
*F03D 3/06* (2006.01)
*F03D 3/00* (2006.01)

(52) U.S. Cl.
CPC ............. *F03D 3/005* (2013.01); *F03D 3/062* (2013.01); *F05B 2240/213* (2013.01)

(58) Field of Classification Search
CPC .......... F03D 3/005; F03D 3/062; F03D 3/009; F05B 2240/213; Y02E 10/74
See application file for complete search history.

(56) References Cited

U.S. PATENT DOCUMENTS

| 1,697,574 A | 1/1929 | Savonius |
| 3,627,446 A | 12/1971 | Wade et al. |

(Continued)

FOREIGN PATENT DOCUMENTS

| DE | 3117875 A1 | 11/1982 | |
| DE | 202011002029 U1 * | 6/2011 | ............. F01D 15/00 |

(Continued)

OTHER PUBLICATIONS

Inami et al. JP2007239631 Espacenet—English Machine Translation (Year: 2007).*

(Continued)

*Primary Examiner* — Nathaniel E Wiehe
*Assistant Examiner* — Wayne A Lambert
(74) *Attorney, Agent, or Firm* — Patshegen IP; Moshe Pinchas (57) ABSTRACT

A Savonius wind turbine has been noted in the past to have the capability to perform more efficiently than other drag-type vertical axis turbines when built according to certain parameters. The previous literature has missed seeing the ratio of the shaft diameter to the available space for wind to pass through in the center as the crucial relationship on which other improvements in this type of turbine can be built. The chord diameter and overlap distance all depend on the size of the central shaft and its ratio to the inner endpoints of the overlapping semicircular blades. The ratios for maximal efficiency are presented here. These efficient ratios also depend for their execution on the turbine rotating at an ideal tip speed ratio.

13 Claims, 6 Drawing Sheets

(56) References Cited

U.S. PATENT DOCUMENTS

| | | | |
|---|---|---|---|
| 3,918,839 A | 11/1975 | Blackwell et al. | |
| 3,941,504 A * | 3/1976 | Snarbach | F03D 3/062 416/197 A |
| 4,362,470 A * | 12/1982 | Locastro | F03D 3/061 416/DIG. 2 |
| 4,784,568 A | 11/1988 | Benesh | |
| 4,830,570 A * | 5/1989 | Benesh | F03D 13/10 415/4.4 |
| 4,838,757 A | 6/1989 | Benesh | |
| 5,494,407 A | 2/1996 | Benesh | |
| 6,283,711 B1 * | 9/2001 | Borg | F03D 3/062 416/135 |
| 6,345,957 B1 * | 2/2002 | Szpur | F03D 3/062 416/197 A |
| 6,428,275 B1 * | 8/2002 | Jaakkola | F03D 3/005 416/DIG. 4 |
| 6,966,747 B2 * | 11/2005 | Taylor | F03D 3/0427 415/908 |
| 7,008,171 B1 * | 3/2006 | Whitworth | H02S 10/12 416/243 |
| 7,896,608 B2 * | 3/2011 | Whitworth | F03D 3/0436 415/4.2 |
| 9,347,428 B2 | 5/2016 | Rhee | |
| 2002/0006334 A1 * | 1/2002 | Szpur | F03D 3/062 416/246 |
| 2006/0263198 A1 * | 11/2006 | Toby Kinkaid | F03D 3/062 415/4.2 |
| 2009/0285689 A1 | 11/2009 | Hall et al. | |
| 2009/0317255 A1 * | 12/2009 | Bertony | F03D 3/062 416/223 R |
| 2010/0024732 A1 | 2/2010 | Mokhlesi et al. | |
| 2011/0206526 A1 * | 8/2011 | Roberts | F03D 3/02 416/223 R |
| 2014/0010654 A1 * | 1/2014 | Fajardo | F03D 3/061 416/147 |
| 2015/0110627 A1 * | 4/2015 | Kim | F03D 3/061 416/197 A |
| 2016/0222942 A1 * | 8/2016 | Fox | F03D 3/061 |
| 2017/0138344 A1 * | 5/2017 | Guignard | F03B 17/065 |
| 2017/0298902 A1 | 10/2017 | Gdovic | |
| 2020/0240392 A1 * | 7/2020 | Rodway | F03D 3/005 |

FOREIGN PATENT DOCUMENTS

| | | | |
|---|---|---|---|
| FR | 658943 A | | 9/1929 |
| JP | 2003-343419 A | | 12/2003 |
| JP | 2007239631 A | * | 9/2007 |
| JP | 2011-64169 A | | 3/2011 |
| JP | 2012-528271 A | | 11/2012 |
| JP | 2015505594 A | | 2/2015 |

OTHER PUBLICATIONS

Steel DE202011002029 ProQuestDocuments—May 10, 2024 English Machine Translation (Year: 2011).*
Examination Report Application 2019380766; Mar. 22, 2023.
European Search Report; European Patent Office; The Hague; Jul. 6, 2022.
OA; JP2021-508307; Apr. 18, 2022.
ISR; Israel Patent Office; Feb. 20, 2020.

* cited by examiner

Figure 1

--Prior Art--

SAVONIUS WIND TURBINE RATIOS

CROSS REFERENCE TO RELATED APPLICATIONS

This patent application claims the benefit of U.S. Provisional Patent Application No. 62/840,929, entitled Savonius Wind Turbine Ratios, filed Apr. 30, 2019, and U.S. Provisional Patent Application No. 62/767,879, entitled Savonius Wind Turbine Variations, filed Nov. 15, 2018.

BACKGROUND OF THE INVENTION

The present invention relates to making Savonius type wind turbines more efficient.

Figure 1:
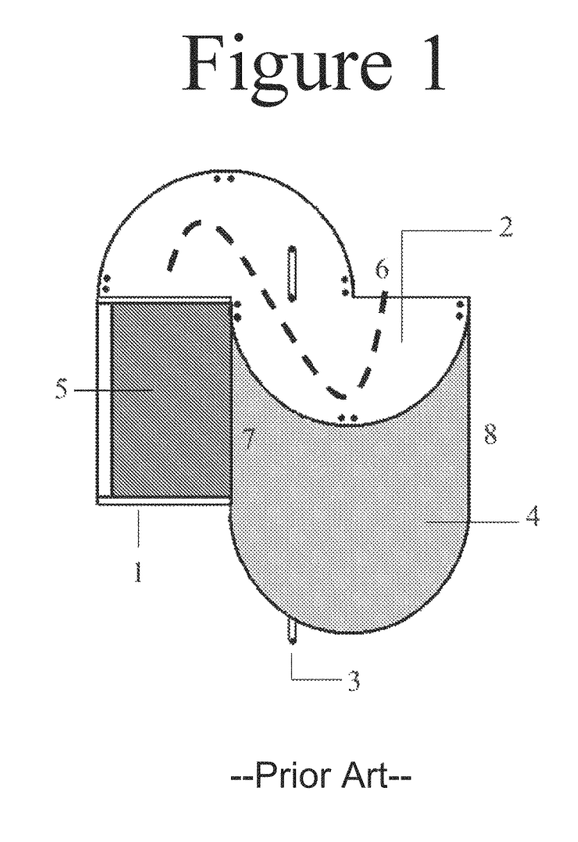
FIG. 1 is a diagram of a tradition al Savonius turbine.

First, the parts of a Savonius turbine are identified. The traditional and simplest Savonius of prior art is shown in FIG. 1.

It has covers on bottom (1) and top (2) that are parallel and similar in size. Sometimes (1) and (2) are complete circles. The blades (4) are perpendicular to the covers and are circular in shape, usually forming an empty half cylinder. They all spin around a central axis (3).

The shaft (3) is not for support, since the two covers (1 and 2) provide that. As a result, the shaft is usually small in relation to the total turbine diameter; in the example shown, it is around 5% of the turbine diameter. There is not necessarily an overlap of the blades around the shaft. There are two blades, each with an inner edge (7) and an outer edge (8). The wind enters the space (5) between the inner edge of one blade and the outer edge of the other and circulates through the turbine following the path (6).

Figure 2:
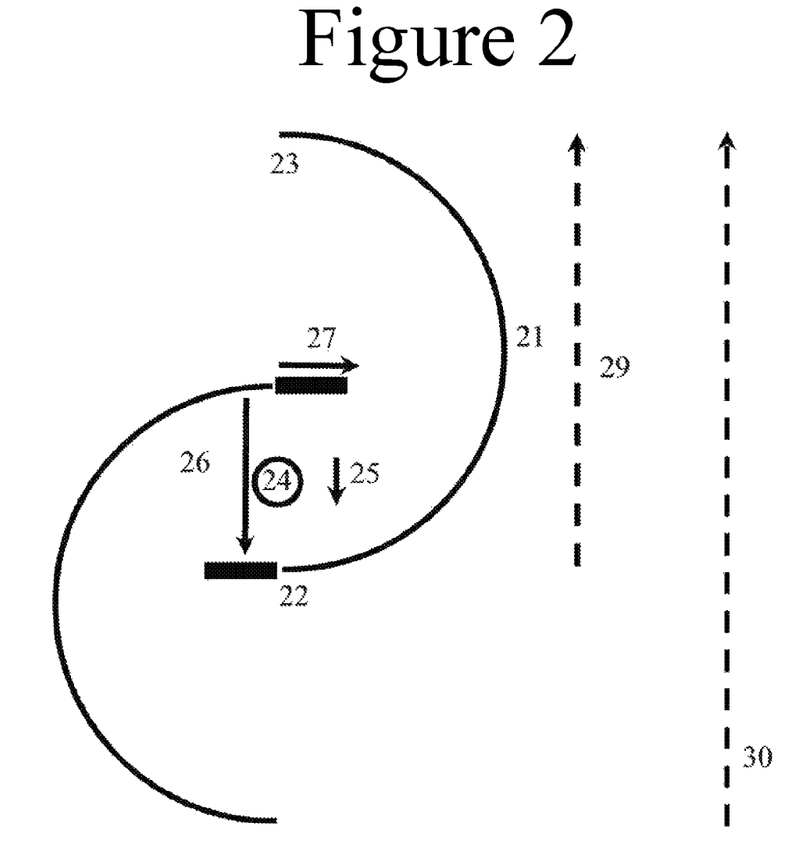
FIG. 2 is a diagram of the significant parts of a Savonius turbine in cross-section.

FIG. 2 is a cross-sectional view. In FIG. 2, each blade (21 and its equivalent facing semicircle) has an inner edge (22) and an outer edge (23). The blade is characterized by a diameter, technically called a chord length (29). There is a central shaft (24) characterized by a shaft diameter (25). (26) represents the distance between the blades passing through the center of the shaft. The free space in the center is (26) minus (25). The turbine diameter (30) is the distance from one outer edge (23) to the outer edge on the second blade.

(27) is the overlap, or extension of the inner edge of the blade, and is a line that extends directly from the inner edge past the midpoint. In this case it is straight.

This patent concerns novel relationships of the shaft, the space between the blades, the overlap, and the chord diameter that lead to greater efficiency. The basic idea behind this is that the passage of wind through the turbine requires just the right conditions to he most advantageous. The concept behind this application is that the free space in the center is the most important element, but it does not stand alone as its relationship to the overlap and to the chord length are related to this free space, so that the free space in the middle does not concentrate the flow too much and create friction, and, on the other hand, does not remain too open and lose the effect of the recirculation of the wind.

A review of previous literature shows that these important relationships have been neglected and the free space in the middle has not been defined-either correctly or at all.

Traditionally, attention on the overlap has focused on overlap ratio, which is defined as (overlap minus shaft diameter)/blade diameter [called chord length or c in our application; sd=shaft diameter]. One study (B.D. Altan, M. Atilgan, An experimental study on improvement of a Savonius rotor performance with curtaining, Experimental Thermal and Fluid Science 32 (2008) 1673-1678) has shown the ideal overlap ratio as 0.15. (Note that this is different from this application's use of overlap ratio in the specifications, because our "overlap ratio" refers to overlap distance divided by shaft diameter so that the prior art use of overlap ratio with our ideal parameters for a turbine of 100 mm shaft would be (20-100)/660, which is a negative figure because the prior art erroneously considered that the overlap should be large in relationship to the shaft diameter.)

Another study (V.J. Modi, N.J. Roth, M.S. Fernando, Optimum-configuration, studies and prototype design of a wind-energy-operated, irrigation system, Journal of Wind Engineering and Industrial Aerodynamics 16 (1984) 85-96.) has shown it to be 0.25. In our opinion, such a variance in opinions and results indicate that there is another factor that determines the conditions for the ideal overlap ratio. The studies do not define its relationship to blade shape and do not mention the key component of free space. However, previous research (see Arriving at the Optimum Overlap Ratio for an Elliptical-Bladed Savonius Rotor, Nur Alom and Ujjwal K. Saha, ASME Turbo Expo 2017: Turbomachinery Technical Conference and Exposition, Volume 9: Oil and Gas Applications; Supercritical CO2 Power Cycles; Wind Energy, Charlotte, North Carolina, USA, June 26-30, 2017 and Mahmoud, which gives the ideal overlap as 0) does not identify the amount of free space as an enabler for this to work; our condition of free space being 3.5*sd in the ideal configuration is a more fundamental condition for other ratios to work.

One study (F. Mahamarakkalage, On the Performance and Wake Aerodynamics of the Savonius Wind Turbine, a Thesis of Doctoral of Philosophy, University of Peradenyia, Srilanka, 1980) showed that no gap is the most efficient and found an efficiency of 32%. We performed simulations with that condition, without using an ideal aspect ratio, as explained above, in all the simulations referred to here so that aspect is consistent, and found a maximum efficiency of 27%, whereas our simulations with gaps, all performed consistently by the same person using similar programming, passed the 30% range.

Another study of Savonius rotors (Geometrical optimization of a swirling Savonius wind turbine using an open jet wind tunnel, Abdullah Al-Faruk*, Ahmad Sharifian, Computational Engineering and Science Research Centre (CESRC), University of Southern Queensland, Toowoomba, Queensland 4350, Australia, Received 19 March 2015; revised 19 June 2016; accepted 11 July 2016, available online 30 July 2016), states, "The results indicate that the blade overlap ratio, hot air inlet diameter and the condition of the top end plate have significant influence on power and torque coefficients . . . " It is another example of the free space being neglected as a condition. Their summary in Table 1 does not mention the central free space at all. Their ideal turbine had a curved overlap.

An experimental study on improvement of Savonius rotor performance, by N. H. Mahmoud a, A. A. El-Haroun a, E. Wahba a, M. H. Nasef b, Alexandria Engineering Journal, Received 15 Jul. 2010; accepted 21 Nov. 2010 only concerns overlap ratios and aspect ratios (height to width).

Computational Fluid Dynamics Prediction of a Modified Savonius Wind Turbine with Novel Blade Shapes, Wenlong Tian, Baowei Song, James H. VanZwieten and Parakram Pyakurel, Energies 2015, 8, 7915-7929; doi:10.3390/en8087915 has the conclusion that no air space at all is preferable and gives an efficiency (called Cp, coefficient of power) of 25%.

A double-step Savonius rotor for local production of electricity: a design study, J.-L Menet, Renewable Energy 29

(2004) 1843-1862 shows no formula or even absolute dimensions for the internal air space and any relationship to shaft size.

Review of Savonius Wind Turbine Design and Performance by M. Zemamou, M. Aggour, and A. Toumi, Energy Procedia, 141 (2017), 383-388 mentions the overlap ratio, aspect ratio, and use of curtains as relevant to Savonius performance, but is silent on the shaft blade relationship.

DESIGN AND DEVELOPMENT OF HYBRID VERTICAL AXIS TURBINE, Md. Jahangir Alam, M. T. Iqbal, Faculty of Engineering and Applied Science, Memorial University of Newfoundland mentions tip speed ratio and overlap ratio as important factors. That is correct, but they are not the only factors.

EPO Application number 86907045.8 (Alvin Benesh, WIND TURBINE SYSTEM USING A SAVONIUS-TYPE ROTOR) notes on page 7: "Although the shaft 28 preferably has a diameter D3 =0.1 Di , there is plenty of room left for an even larger size shaft, if so desired. Applicant's tests have shown that a similar rotor showed no appreciable loss in efficiency due to constriction of the wind passage through the rotor blades 21 , 22 and 15 the size of the shaft 28. However, applicant has noticed that if the air passage in the vicinity of the shaft 28 is completely blocked, there is a significant drop in efficiency." He only relates the shaft diameter to the diameter of the entire turbine. He believes that there is no difference in efficiency no matter what the free air space is—a conclusion at the polar opposite of the current application.

Experimental investigations on single stage, two stage and three stage conventional Savonius rotor, M. A. Kamojil, S. B. Kedare 1 and S. V. Prabhu, Int. J. Energy Res. 2008; 32:877-895 does not consider shaft and free space relationships.

Experimental investigations on single stage modified Savonius rotor, M. A. Kamoji a, S. B. Kedare a, S. V. Prabhu, Applied Energy 86 (2009) 1064-1073 is also silent on the parameters discussed: "The parameters studied are overlap ratio, blade arc angle, aspect ratio and Reynolds number. The modified Savonius rotor with an overlap ratio of 0.0, blade arc angle of 124_and an aspect ratio of 0.7 has a maximum coefficient of power of 0.21 at a Reynolds number of 1,50,000, which is higher than that of conventional Savonius rotor (0.19). Correlation is developed for a single stage modified Savonius rotor for a range of Reynolds numbers studied."

A review on the performance of Savonius wind turbines by Joao Vicente Akwaa, Horácio Antonio Vielmo, Adriane Prisco Petry, Renewable and Sustainable Energy Reviews 16 (2012) 3054-3064 confirms the prevailing view that the center shaft with air space is an interference that can be dispensed with.

Definition: Wind turbines have an angular velocity of w (or frequency of $$f = \frac{\omega}{2\pi} 60 \; RPM$$

The tip speed ratio (TSR, shown as a lambda) is therefore $\lambda = \omega R_t / U$ That is: the ratio between the tangential speed of the tip of a blade and the actual speed of the wind. This is important as a determinant of the efficiency and varies with the diameter and design of the turbine.

BRIEF SUMMARY OF THE INVENTION

The present invention successfully addresses the shortcomings of the presently known configurations by providing an improved configuration of the aerodynamic parameters of a Savonius type of wind turbine.

It is now disclosed for the first time a vertical axis turbine, comprising two similar blades, substantially semi-circular in a horizontal plane for any cross-section along the height of the turbine, with a central shaft in the vertical direction, whose concave sides partially face each other, each with a chord diameter of distance c, referring to the distance on the inside face of the blades, said blades spaced at a distance a passing in a straight line through the shaft of diameter sd , from an inner endpoint of the semicircle of the first blade to an inner endpoint of the semicircle of the second blade, the location of the inner endpoint facing the opposing blade at less than half the distance of the chord from the inner endpoint of the opposing blade to an outer endpoint of the opposing blade, comprising:

the distance a is substantially 3 to 4 times sd.

According to another embodiment, the distance a is approximately 3.5 times sd.

According to another embodiment, c is 6 to 7.2 times a.

According to another embodiment, c is approximately 6.6 times a.

In one embodiment, the system further comprises -an overlap called b, which is an extension at the end of the inner endpoints of both blades, substantially perpendicular in a horizontal plane to the virtual line connecting the two inner end points and the center of the shaft, said overlap comprising a substantially straight body extending from the inner endpoint of each blade, said overlap being 0 to .25 times a.

According to another embodiment, said overlap is approximately 0.2 times a.

According to another embodiment, the blades have no upper cover connected to the blades at the upper tips.

According to another embodiment, the blades have no lower connecting base.

In one embodiment, the turbine further comprises:
a variation in the semicircle diameter along the majority of the vertical height of the blades of less than 15%.

In one embodiment, the turbine further comprises:
a tip speed ratio of a range of 0.475 to 0.546 times the shaft diameter in millimeters for a turbine with a 100 mm shaft diameter, said tip speed ratio approximately doubling for each doubling of the shaft diameter, and proportionately for sizes in between, and approximately halving, and proportionately halving for sizes in between, for each halving of the shaft diameter, and for other shaft diameters in proportion to this ratio.

According to another embodiment, the two blades are shaped as a double curve.

It is now disclosed for the first time a method of making a vertical axis turbine, comprising two similar blades, substantially semi-circular in a horizontal plane for any cross-section along the height of the turbine, with a central shaft in the vertical direction, whose concave sides partially face each other, each with a chord diameter of distance c, referring to the distance on the inside face of the blades, said blades spaced at a distance a passing in a straight line through the shaft of diameter sd , from an inner endpoint of the semicircle of the first blade to an inner endpoint of the semicircle of the second blade, the location of the inner endpoint facing the opposing blade at less than half the distance of the chord from the inner endpoint of the opposing blade to an outer endpoint of the opposing blade, providing the steps of:

choosing a shaft diameter, making the distance from the inside of one blade to the inside of the other passing through the center of the shaft approximately 3.5 times the shaft diameter, with a range of 3-4,     making overlaps of approximately 20% times the shaft diameter, with a range of 0% to 25%,     making chord lengths of approximately 6.6 times the shaft diameter, with a range of 6 to 7.2.

Figure 5:
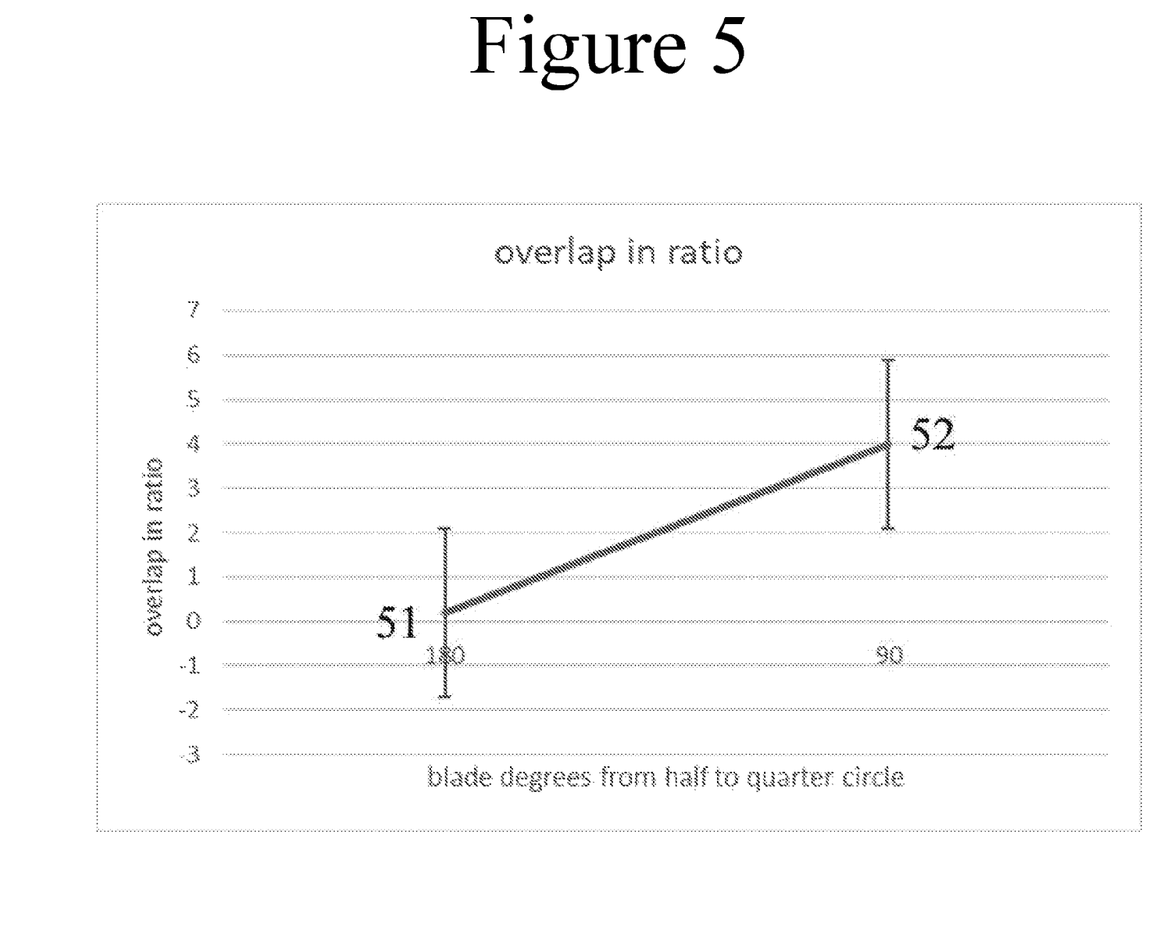
FIG. 5 is a graph of the overlap ratio in a quarter circle Savonius.
Figure 6:
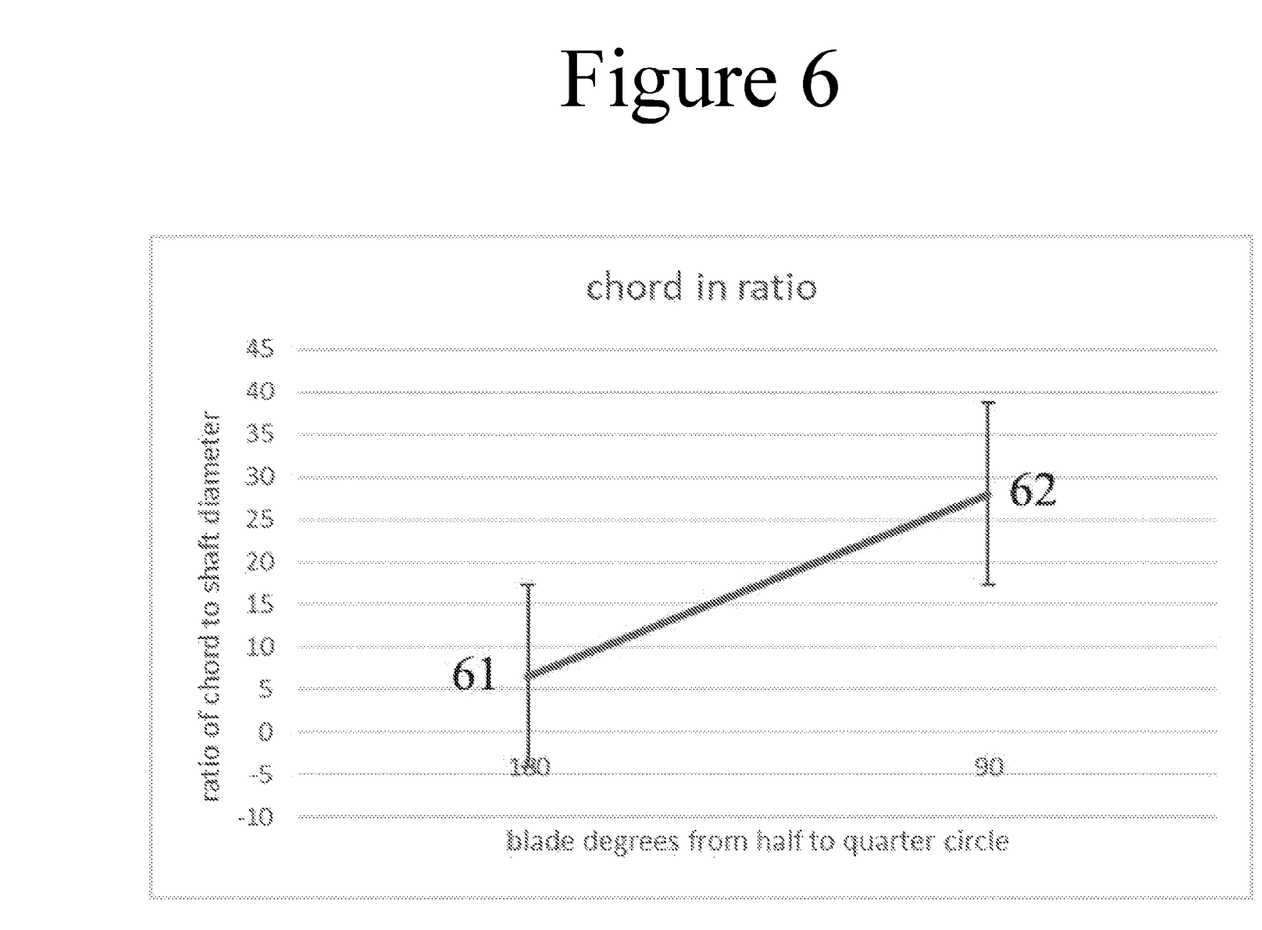
FIG. 6 is a graph of the chord ratio in a quarter circle Savonius.

In one embodiment, the method further comprises the steps of:

varying the orientation of the blades from semicircular to quarter circular on a proportional basis, and setting the distance between the blades from approximately 3.5 to 4 times the shaft diameter according to the number of degrees of change, and setting the overlap ratio according to the line set forth in FIG. 5 from 0 to 4 times the shaft diameter according to the number of degrees of change, and setting the chord diameter according to the graph set forth in FIG. 6 from approximately 6.6 to 30 times the shaft diameter.

Claims With References to the Items in the Figures:

1. A vertical axis turbine, comprising two similar blades, substantially semi-circular (21) in a horizontal plane for any cross-section along the height of the turbine, with a central shaft (24) in the vertical direction, whose concave sides partially face each other, each with a chord diameter of distance c, referring to the distance on the inside face of the blades (29), said blades spaced at a distance a (26) passing in a straight line through the shaft of diameter sd (25), from an inner endpoint (22) of the semicircle of the first blade to an inner endpoint of the semicircle of the second blade, the location of the inner endpoint facing the opposing blade at less than half the distance of the chord from the inner endpoint of the opposing blade to an outer endpoint of the opposing blade (22 and 23), comprising:

the distance a is substantially 3 to 4 times sd.

2. The turbine of claim 1, wherein the distance a is approximately 3.5 times sd.

3. The turbine of claim 1 or 2, wherein c is 6 to 7.2 times a.

4. The turbine of claim 1, 2, or 3, wherein c is approximately 6.6 times a.

5. The turbine of claim 1, 2, 3, or 4, further comprising:

an overlap called b (27), which is an extension at the end of the inner endpoints of both blades, substantially perpendicular in a horizontal plane to the virtual line connecting the two inner end points and the center of the shaft, said overlap comprising a substantially straight body extending from the inner endpoint of each blade, said overlap being 0 to 0.25 times a.

6. The turbine of claim 1, 2, 3, 4, or 5, wherein said overlap is approximately 0.2 times a.

7. The turbine of claims 1, 2, 3, 4, 5, 6, wherein the blades have no upper cover (2) connected to the blades at the upper tips.

8. The turbine of claim 1, 2, 3, 4, 5, 6, or 7, wherein the blades have no lower connecting base (1).

9. The turbines of claim 1, 2, 3, 4, 5, 6, 7, or 8, further comprising:

a variation in the semicircle diameter along the majority of the vertical height of the blades of less than 15%.

10. The turbine of claims 1, 2, 3, 4, 5, 6, 7, 8, or 9, further comprising:

a tip speed ratio of a range of 0.475 to 0.546 times the shaft diameter in millimeters for a turbine with a 100 mm shaft diameter, said tip speed ratio approximately doubling for each doubling of the shaft diameter, and proportionately for sizes in between, and approximately halving, and proportionately halving for sizes in between, for each halving of the shaft diameter, and for other shaft diameters in proportion to this ratio.

11. The turbine of claims 1, 2, 3, 4, 5, 6, 7, 8, 9, or 10, wherein the two blades are shaped as a double curve.

12. A method of making a vertical axis turbine, A vertical axis turbine, comprising two similar blades, substantially semi-circular (21) in a horizontal plane for any cross-section along the height of the turbine, with a central shaft (24) in the vertical direction, whose concave sides partially face each other, each with a chord diameter of distance c, referring to the distance on the inside face of the blades (29), said blades spaced at a distance a (26) passing in a straight line through the shaft of diameter sd (25), from an inner endpoint (22) of the semicircle of the first blade to an inner endpoint of the semicircle of the second blade, the location of the inner endpoint facing the opposing blade at less than half the distance of the chord from the inner endpoint of the opposing blade to an outer endpoint of the opposing blade (22 and 23), providing the steps of:

choosing a shaft diameter, making the distance from the inside of one blade to the inside of the other passing through the center of the shaft approximately 3.5 times the shaft diameter, with a range of 3-4,     making overlaps of approximately 20% times the shaft diameter, with a range of 0% to 25%,     making chord lengths of approximately 6.6 times the shaft diameter, with a range of 6 to 7.2.

13. The method of claim 12, further comprising the steps of:

varying the orientation of the blades from semicircular to quarter circular on a proportional basis, and setting the distance between the blades from approximately 3.5 to 4 times the shaft diameter according to the number of degrees of change, and setting the overlap ratio according to the line set forth in FIG. 5 from 0 to 4 times the shaft diameter according to the number of degrees of change, and setting the chord diameter according to the graph set forth in FIG. 6 from approximately 6.6 to 30 times the shaft diameter.

BRIEF DESCRIPTION OF SEVERAL VIEWS OF THE DRAWINGS

The invention is herein described, by way of example only, with reference to the accompanying drawings, wherein.

DETAILED DESCRIPTION OF THE INVENTION

The principles and operation of a wind turbine according to the present invention may be better understood with reference to the drawings and the accompanying description.

Referring now to the drawings, FIGS. 1 and 2 show the different parameters which were already identified. In FIG. 2, the shaft is a percentage of over 10% of turbine diameter. This enables greater strength and efficiency. In FIG. 1, previous art, the shaft would be closer to 5% of the turbine diameter.

Note that parameters in this application refer to the internal surface of the blades that faces the shaft.

According to FIG. 2, the ideal parameters are revealed and calculated as follows. They apply to all sizes; the shaft diameter of 100 mm is presented for ease of understanding the numbers. The reasonably expected variation on each will be shown later. Assuming that the shaft (24) is 100 mm in diameter (distance 25 in FIG. 2), called sd, then:

The inner edge to inner edge distance (item 26 in FIG. 2) is ideally sd×3.5, or 350 mm The extension b (item 27 in FIG. 2) is ideally sd×0.2, or 20 mm The chord distance (blade diameter) c (item 29 in FIG. 2, which is the distance from item 22 to item 23) is ideally sd×6.6, or 660 mm. And then, just for information, the diameter of the total turbine is shown by item 30 in FIG. 2 and is calculated as (sd×6.6)+((sd*6.6)−(sd*3.5)).

The range of well performing configurations is for the distance from the semicircular inner edge of one blade to the semicircular inner edge of the other blade (defined like this so there is no confusion when an overlap is present) to be 3-4 times the shaft diameter, with the ideal being 3.5.

The range of well performing overlaps is 5-25% of the shaft diameter, with the ideal being 20%, but even a zero overlap to a 40% overlap can result in an efficient turbine.

This works best in combination with a chord of 6-7 times the shaft diameter, with the ideal 6.6.

The following table (Table 1) is a selection of some simulations: (The turbine diameter is chord diameter plus chord diameter minus inner edge distance.)

| Case | Shaft diameter | Inner edge to inner edge distance | Over-lap | Chord radius | Chord diameter | Tip speed ratio | Cp (efficiency) |
|---|---|---|---|---|---|---|---|
| 1 | 100 | 380 | none | 330 | 660 | .47 | .31 |
| 2 | 100 | 300 | 20 | 380 | 760 | .47 | .26 |
| 3 | 100 | 380 | 10 | 380 | 760 | .5 | .31 |
| 4 | 100 | 380 | 25 | 330 | 660 | .49 | .31 |
| 5 | 100 | 380 | 30 | 330 | 660 | .49 | .32 |
| 6 | 100 | 380 | 20 | 300 | 600 | .47 | .26 |
| 7 | 100 | 380 | 20 | 330 | 660 | .495 | .32 |
| 8 | 100 | 350 | 20 | 330 | 660 | .511 | .344 |
| 9 | 100 | 400 | 20 | 330 | 660 | .47 | .28 |

Case 8 has the highest efficiency and represents the ideal set of ratios set forth above. It can be seen that other close sets of parameters also perform well. This is the first time that theoretical efficiencies for Savonius type turbines have been consistently reported to be above 30% because the inner shaft to free space requirement has been focused on, and secondarily the relationship to chord distance. The overlap is important but relatively less significant. The tip speed ratio is highly significant, as will be shown in more detail below.

Figure 3:
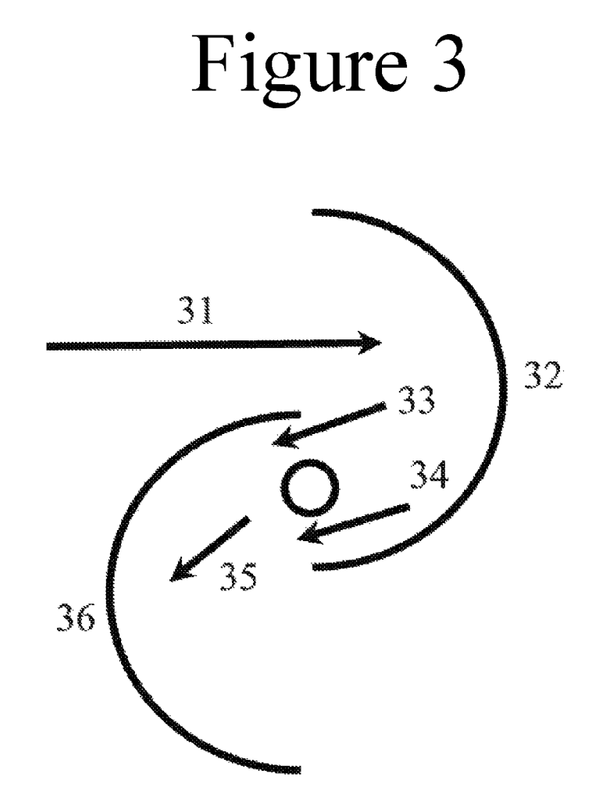
FIG. 3 is a diagram of the air flow through a Savonius turbine

FIG. 3 shows the circulation of the wind within a Savonius turbine and illustrates why the ratios of the current invention are important. In FIG. 3, the wind is coming from the left and is shown impacting on the first blade (32) by line (31). The wind then circulates around the shaft along lines (33) and (34). When the ratios are ideal, as in the calculation above, there is an area of wind circulating within the turbine that accelerates to higher than the prevailing outside wind in the region of arrow (35) and then impacts on the second blade (36). This reveals the importance of attention to the free space in the center of the turbine. It should not be too large or too small so that the wind is concentrated in the right way. The overlaps, also referred to as extensions from the semicircles, prevent the dissipation of wind by sideways movements of air inside the turbine.

One additional innovative approach is to skip the upper cover and instead make 2 blades without that cover and additionally 2 blades that are double curved (a less steep curve in the vertical direction) instead of being simple half circles along their vertical dimension. That captures the wind better and they are more streamlined. This approach needs to be balanced with the higher efficiency of using the correct ratios throughout the vertical span of the turbine. A reasonable compromise would allow a variation of 15% of each of the blade shape and semicircle diameter from the ideal parameters in any horizontal plane. That is new when combined with some of the other changes.

Leaving out the covers necessitates a thicker shaft, because it is used for support. The review above found no cases in which the relationship of the shaft size to the free space between the blades has been defined, and, simultaneously, the conditions for a proper overlap once the conditions of the free space are satisfied.

Based on the above, the original claim is presented that the efficiency is largely related to the amount of free space in the middle for the air to pass through and the ratio of shaft size to total space between the blades is crucial. This advantage is enhanced in combination with the other ratios and parameters discussed in this application.

The above table 1 shows that the conditions of highest efficiency are multifactorial, but everything is based on the shaft diameter, which determines the free space and all the other ratios.

The tip speed ratio (TSR) is known in the art and is $$\lambda = \bullet R_s / U$$

That is: the ratio between the tangential speed of the tip of a blade and the actual speed of the wind. This has a lot to do with efficiency in all turbines. In these cases, a tip speed ratio of around 0.511 is the best. Below 0.475 it becomes substantially less efficient for the size shown above. So 0.511 plus or minus 0.035 is the good range for this size of turbine. If the turbine diameter doubles, then the TSR approximately doubles. Here case 8 has a turbine diameter of 970 mm For this type of turbine, this part is not related to shaft diameter. So a turbine with the ratios of case 8 but a shaft diameter of 200, would have a TSR of approximately 1.22 plus or minus 0.07.

In general Cp is related to the Reynolds number and the tip-speed-ratio (TSR). Usually, the dependence on the Reynolds number is small, so the pressure coefficient depends mainly on the TSR. The TSR and rpm need to be set correctly in order to achieve the highest efficiency. Note that failing to pay attention to this ratio can result in very inefficient wind turbines.

Previous literature has claimed Cp for Savonius turbines without paying attention to the primacy of the free space in the center in the mid-20s. The simulations include one configuration of 0.34 Cp, case 8, which shows that the current approach is not only innovative but also meaningful.

Therefore, in the claims that follow, the calculation of free space is considered the key innovation in the independent claims.

Once that is satisfied, other key innovations, such as the relationship of overlap ratio to blade size based on blade arc, are more operative.

Figure 4:
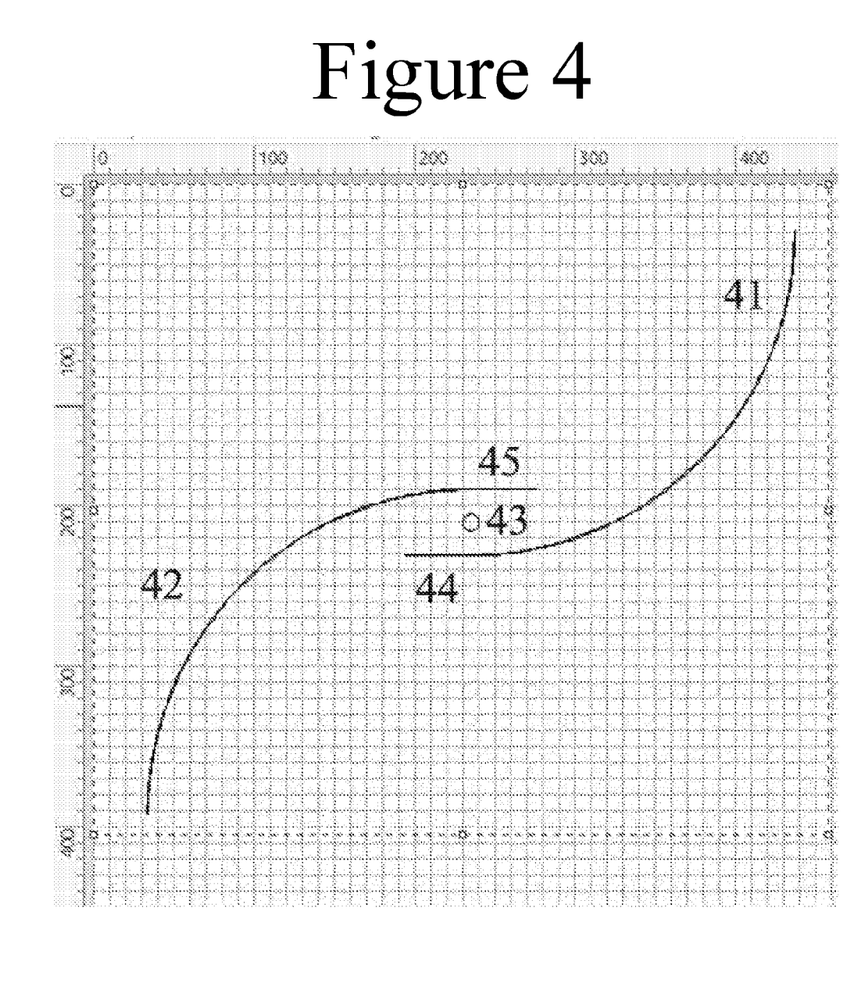
FIG. 4 is a diagram of a quarter circle Savonius.

Another variation on the Savonius semicircles is possible by making different blade shapes approaching a quarter circle. These configurations are slightly less efficient, but could be useful in some circumstances such as different cost-benefit situations. FIG. 4 illustrates how that would look with grid lines in the background to show the distances. (41) and (42) are the blades. (43) is the shaft. (44) and (45) are the overlaps, or extensions of the quarter circles. This configuration is called 5e.

By the time the blades are quarter circle, the ideal overlap changes from 0.2 times shaft diameter to 4 times the shaft diameter, where the distance between the blades is 4 times the shaft diameter, with a range of 3 to 5 times, and the chord diameter is 5 times the shaft diameter, with a range of 4-6 times.

The following table 2 shows some Cp (efficiency) simulation data for a configuration we call 5e, according to rpm and tip speed ratio:

| RPM | λ | Case 5e |
|---|---|---|
| 38 | 0.39 | 0.29 |
| 57 | 0.59 | 0.30 |
| 76 | 0.79 | 0.28 |

This shows an ideal tip speed ratio for the chord diameter of approximately 3meters.

FIG. 5 shows the variation of overlap with shape of the circle. One can approximate the ideal overlap according to the number of degrees of the circle by using FIG. 5. (51) is the ratio of 0.2 times shaft diameter for a semi-circle and (52) is the ratio of 4 times the shaft diameter for a quarter circle.

FIG. 6 shows the variation of chord diameter with shape of the circle. One can approximate the ideal chord diameter according to the number of degrees of the circle by using FIG. 6. (61) is the ratio of 6.6 times shaft diameter for a semi-circle and (62) is the ratio of 28 times the shaft diameter for a quarter circle.

The invention claimed is:

1. A vertical axis turbine, comprising a first blade and a second blade, each of which is semicircular in a horizontal plane for any cross-section along the height of the turbine, with a central shaft in the vertical direction, the first blade and the second blade each having concave sides that partially face each other, each semicircle of the first and second blades extends between an inner endpoint and an outer endpoint, and is characterized by a chord diameter c, referring to the distance between said inner endpoint and said outer endpoint, wherein said blades are spaced at an inner distance a extending along a virtual line from the inner endpoint of the semicircle of the first blade to the inner endpoint of the semicircle of the second blade and passing in a straight line through the shaft having a diameter of sd, wherein the inner distance a is 3 to 4 times the shaft diameter sd, wherein the chord diameter c is 6 to 7.2 times the shaft diameter sd.

2. The turbine of claim 1, wherein the shaft diameter sd is 100 mm.

3. The turbine of claim 1 wherein the blades have no upper cover connected to the blades at the upper tips.

4. The turbine of claim 1 wherein the blades have no lower connecting base.

5. The turbines of claim 1 further comprising:
a variation in the semicircle diameter along the majority of the vertical height of the blades of less than 15%.

6. The turbine of claim 1 wherein the two blades are shaped as a double curve.

7. A method of making a vertical axis turbine, the method comprising:

providing a first blade and a second blade, each of which is semicircular in a horizontal plane for any cross-section along the height of the turbine, with a central shaft in the vertical direction, the first blade and the second blade each having concave sides that partially face each other, each semicircle of the first and second blades extends between an inner endpoint and an outer endpoint, and includes a chord diameter c, referring to the distance between said inner endpoint and said outer endpoint, wherein said blades are spaced at an inner distance a extending along a virtual line from the inner endpoint of the semicircle of the first blade to the inner endpoint of the semicircle of the second blade and passing in a straight line through the shaft having a diameter of sd, choosing a shaft diameter sd, making the inner distance a 3 to 4 times the shaft diameter sd, and making a chord diameter c of 6 to 7.2 times the shaft diameter sd.

8. The method of claim 7, further comprising:
making overlaps of 20% times the shaft diameter sd.

9. The turbine of claim 1 wherein the distance a is 3.5 the shaft diameter sd, and wherein the distance c is 6.6 times the shaft diameter sd.

10. The turbine of claim 1 wherein each one of said first and second blades includes an extension extending at a straight line from the inner endpoint such that said extension is perpendicular in a horizontal plane to the virtual line, wherein said first and second blades are disposed with respect to one another such that the extension of said first blade overlaps with an overlapping section of said second blade and the extension of said second blade overlaps with an overlapping section of said first blade, and wherein said overlapping sections are at an overlap length b, and wherein said overlap length b is 0 to 4 times the shaft diameter sd.

11. The turbine of claim 10, wherein said overlap is 0.2 times sd.

12. The method of claim 7 wherein the inner distance from an inside of one blade to an inside of another blade and passing through a center of the shaft is 3.5 the shaft diameter sd, and wherein the chord diameter c is 6.6 times the shaft diameter sd.

13. The method of claim 7 further comprising providing on each one of said first and second blades an extension extending at a straight line from the inner endpoint such that said extension is perpendicular in a horizontal plane to the virtual line, wherein said first and second blades are disposed with respect to one another such that the extension of said first blade overlaps with an overlapping section of said second blade and the extension of said second blade overlaps with an overlapping section of said first blade, and wherein said overlapping sections are at an overlap length b, and making said overlap length b 0 to 4 times the shaft diameter sd.

* * * * *